(12) United States Patent
Platvoet et al.

(10) Patent No.: US 9,134,024 B2
(45) Date of Patent: Sep. 15, 2015

(54) RADIAL BURNER AIR INLET WITH LINEAR VOLUMETRIC AIR CONTROL

(75) Inventors: Erwin M. Platvoet, Owasso, OK (US); Thomas M. Korb, Owasso, OK (US); Michel Sean McKinney, Owasso, OK (US); Ronnie Glen Taylor, Broken Arrow, OK (US); Chad Nathan Carroll, Broken Arrow, OK (US)

(73) Assignee: John Zink Company, LLC, Tulsa, OK (US)

( * ) Notice: Subject to any disclaimer, the term of this patent is extended or adjusted under 35 U.S.C. 154(b) by 549 days.

(21) Appl. No.: 13/553,485

(22) Filed: Jul. 19, 2012

(65) Prior Publication Data

US 2014/0020607 A1   Jan. 23, 2014

(51) Int. Cl.
| | | |
|---|---|---|
| F23N 1/02 | (2006.01) | |
| F23C 7/00 | (2006.01) | |
| F23L 3/00 | (2006.01) | |
| F23L 13/06 | (2006.01) | |
| F23D 14/22 | (2006.01) | |
| F23D 23/00 | (2006.01) | |
| G05D 7/01 | (2006.01) | |
| G05D 7/03 | (2006.01) | |
| G05D 7/00 | (2006.01) | |

(52) U.S. Cl.
CPC ............... *F23C 7/008* (2013.01); *F23D 14/22* (2013.01); *F23D 23/00* (2013.01); *F23L 3/00* (2013.01); *F23L 13/06* (2013.01); *F23C 2900/06043* (2013.01); *G05D 7/00* (2013.01); *G05D 7/01* (2013.01); *G05D 7/03* (2013.01)

(58) Field of Classification Search
CPC ............ G05D 7/00; G05D 7/01; G05D 7/03; F23L 3/00; F23L 3/06; F23L 13/06
USPC ......... 431/2, 9, 12; 126/110 B, 110 C, 285 A, 126/285 R, 286, 290
See application file for complete search history.

(56) References Cited

U.S. PATENT DOCUMENTS

| | | |
|---|---|---|
| 823,836 A | 6/1906 | Weimann |
| 4,347,832 A | 9/1982 | Myers |
| 4,394,857 A | 7/1983 | Iannone |
| 4,509,499 A | 4/1985 | Hebert |
| 5,669,373 A | 9/1997 | Gulddal |
| 5,944,506 A | 8/1999 | Kamal et al. |
| 6,336,449 B1 | 1/2002 | Drisdelle et al. |
| 6,695,609 B1 * | 2/2004 | Chung et al. ............ 431/9 |
| 7,244,119 B2 | 7/2007 | Chung et al. |
| 7,665,458 B2 * | 2/2010 | Waltz et al. ............ 126/290 |
| 2011/0117506 A1 | 5/2011 | Poe et al. |

\* cited by examiner

*Primary Examiner* — Kenneth Rinehart
*Assistant Examiner* — Gajanan M Prabhu
(74) *Attorney, Agent, or Firm* — McAfee & Taft, PC (57) ABSTRACT

An apparatus and method are provided for controlling the introduction of air into a burner. More particularly, the invention provides for a damper system that controls the introduction of air into a burner system by altering the size of a peripheral flow path for the introduction of air into the plenum of the burner.

30 Claims, 6 Drawing Sheets

RADIAL BURNER AIR INLET WITH LINEAR VOLUMETRIC AIR CONTROL

BACKGROUND OF THE INVENTION

1. Field of the Invention

The present invention relates to a burner apparatus and methods of burning fuel gas in the presence of air. More specifically, the present invention relates to apparatus and methods for air introduction and air damping in such a gas burner apparatus.

2. Description of the Related Art

The majority of process burners get the air required for combustion through "natural draft." In such natural draft burners, air flows through the burner into a process heater because of the light negative pressure inside the heater firebox. As a result, the air side pressure drop over the burner is low, typically less than about 1 inH2O (about 249 Pa) and often from about 0.25 to about 0.6 inH2O (about 62 Pa to about 149 Pa). This low pressure means there is a lack of resistance necessary to correct flow maldistributions. Burners are sensitive to flow maldistributions, which create less than optimal flame conditions, and hence, can lead to higher emissions of carbon monoxide and $NO_X$, uneven and longer flames, detrimental impact on flue gas recirculation patterns inside the firebox, and poor excess air control during turndown of burner duty.

Generally, such natural draft burners have one of three types of air inlets or registers. An early design uses two concentric metal cylinders. Each cylinder has slots. One cylinder is stationary while the other can be rotated. By rotating the cylinder, all or a portion of the slots on one cylinder can be aligned with the slots on the other cylinder, thus allowing more or less air to flow through the slots. A subsequent design uses only a single stationary cylinder with slots. In this design, each slot is fitted with a damper blade on a shaft. By adjusting the angle of the damper blade, more or less air is allowed through the slots. A third type of air register utilizes an air inlet box located on the side of the burner plenum. The air inlet box has a single or multi-blade damper. The angle of the damper blades determines the amount of air flow into the plenum.

These conventional registers have difficulty with flow maldistributions. The conventional cylinder designs are subject to unwanted air turbulence and spiral air flow. The air inlet box design relies on side entry that causes uneven distribution of air across the plenum and, hence, the burner. Additionally, damper blades as air flow regulators do not regulate air in a linear fashion and, thus, are difficult to adjust to achieve the desired air flow. Accordingly, because burners are sensitive to flow maldistributions, as discussed above, there are often problems with such burner systems such as higher than optimal carbon monoxide and $NO_X$ emissions. Further, it is difficult to achieve tight shutoff with damper blades and concentric cylinders even when they are fully closed. It is desirable to have a register that overcomes these difficulties.

SUMMARY OF THE INVENTION

In accordance with one embodiment of the invention there is provided a burner system comprising a plenum, a burner tile, a primary fuel nozzle, a front plate, and a damper plate. The plenum has a perimeter wall with a first end having an air inlet disposed therein and a second end having an air outlet disposed therein. The first end opposes the second end. The burner tile is attached to the second end at the air outlet. The burner tile has an opening formed therein for allowing air to flow therethrough. The primary fuel nozzle is connectable to a fuel source and positioned in relation to the burner tile such that air and fuel are burned within and adjacent to the top of the burner tile. The front plate is mounted a fixed distance below the air inlet of the plenum. The damper plate is mounted between the first end and the front plate to thus form a peripheral flow path for the introduction of air into the inlet of the first end, wherein the front plate, damper plate, air inlet, air outlet and the opening of the burner tile are axially aligned along a longitudinal axis and the damper plate is moveable along the longitudinal axis such that the size of the flow path is changed.

In a further embodiment there is provided an air damper for controlling air flow to a burner plenum. The burner plenum has a housing defining a first opening and a second opening opposing the first opening wherein air is introduced into the burner plenum through the first opening and the second opening supplies air to a burner. The air damper comprises a damper plate mounted adjacent the first opening so as to define a flow path between the damper plate and the housing so that air enters the first opening through the flow path and is introduced into the burner plenum. The burner, first opening, second opening and damper plate are axially aligned along a longitudinal axis and the damper plate is moveable relative to the first opening along the longitudinal axis so as to change the size of the flow path.

In another embodiment of the invention there is provided a damper system comprising a top ring, a front plate, a damper plate and an actuator. The top ring defines an aperture therein and has a flat bottom surface. The front plate is mounted a fixed distance from below the flat bottom surface of the top ring. The damper plate comprises a flat disk having an upper surface. The damper plate is mounted between the top ring and the front plate so as to define a flow path between the damper plate and the top ring so that air enters the aperture of the top ring peripherally through the flow path. The damper plate is moveable relative to the top ring so as to change the size of the flow path and so as to have an uppermost position where the upper surface is in contact with the flat bottom surface of the top ring. The actuator is operationally connected to the damper plate to provide linear volumetric air flow control.

In yet another embodiment there is provided a burner system comprising a primary plenum having an air inlet. Located within the primary plenum are at least two secondary plenums having a perimeter wall having a first end with an air inlet disposed therein and a second end with an air outlet disposed therein. The first end opposes the second end. Associated with each secondary plenum is a burner tile attached to the second end at the air outlet. The burner tile has an opening formed therein for allowing air to flow therethrough. Also associated with each plenum is a primary fuel nozzle connectable to a fuel source and positioned in relation to the burner tile such that air and fuel are burned within and adjacent to the top of the burner tile. At the first end of the secondary plenum is a front plate mounted outside the secondary plenum and a fixed distance from the air inlet of the plenum. The front plate is located inside the primary plenum. A damper plate is mounted between the first end of the secondary plenum and the front plate to thus form a peripheral flow path for the introduction of air into the inlet of the first end. The front plate, damper plate, air inlet, air outlet and the opening of the burner tile are axially aligned along a longitudinal axis and the damper plate is moveable along the longitudinal axis such that the size of the flow path is changed.

BRIEF DESCRIPTION OF THE DRAWINGS

FIG. 6 is a schematic illustration of a forced air multi-burner system utilizing an embodiment of the invention.

DESCRIPTION OF THE PREFERRED EMBODIMENTS

Figure 1:
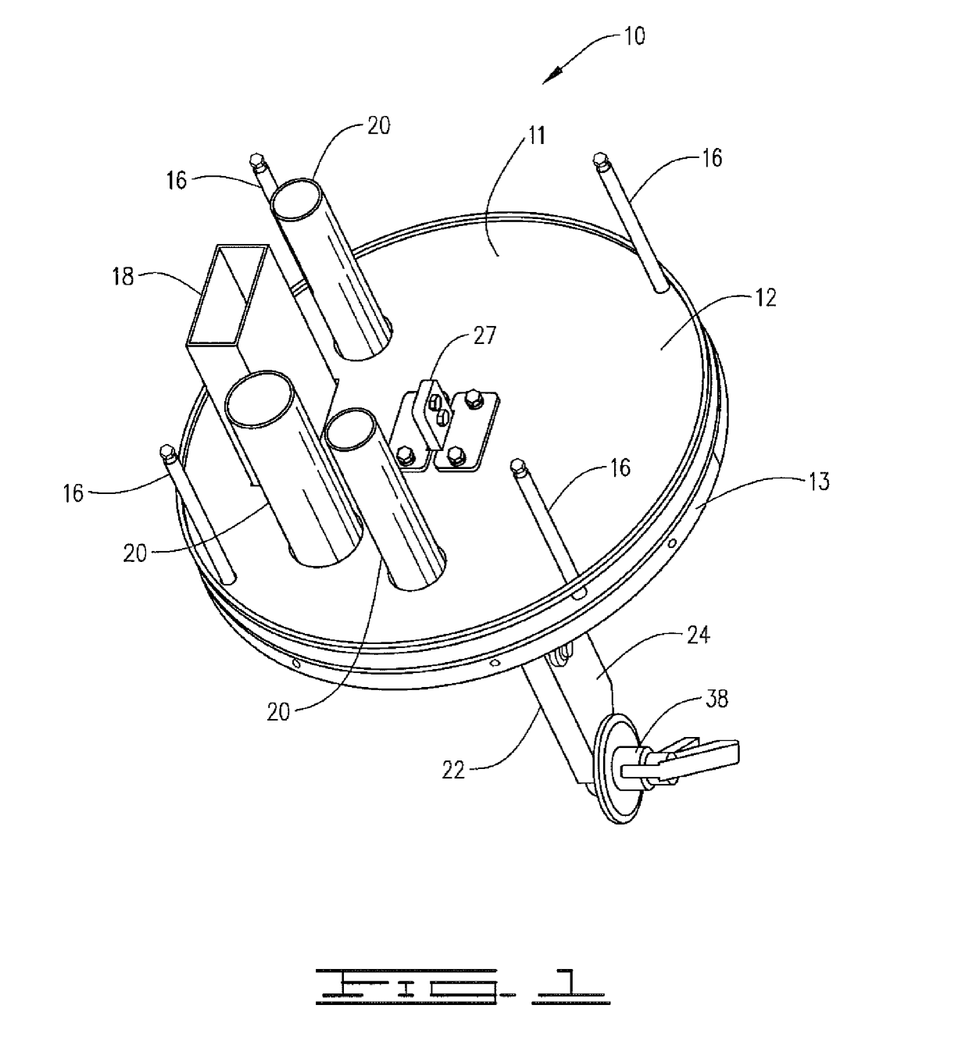
FIG. 1 is a perspective view of a damper system in accordance with one embodiment of the invention, shown without a cam.
Figure 2:
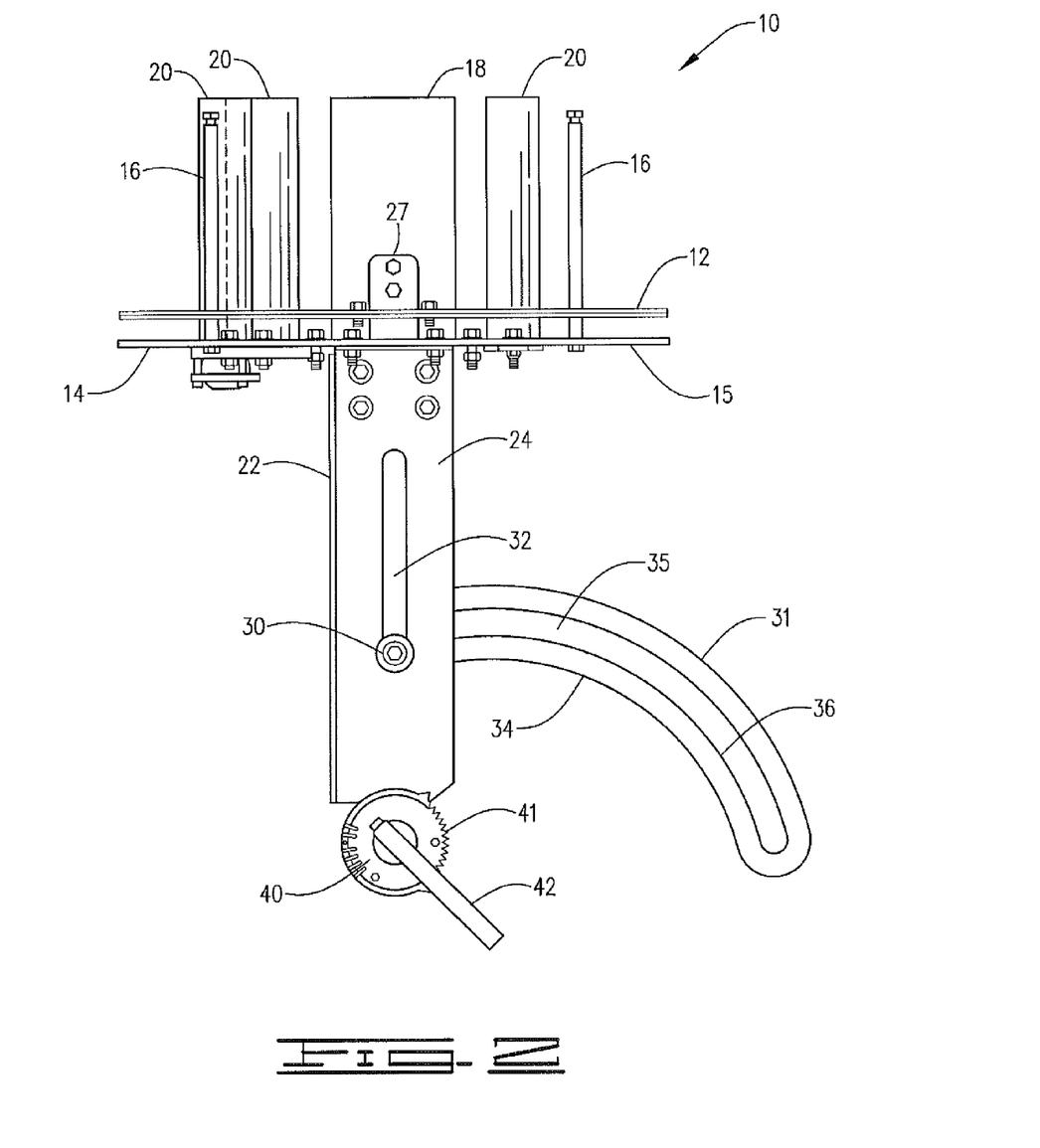
FIG. 2 is a side elevation view of the damper of FIG. 1, shown with a cam.
Figure 3:
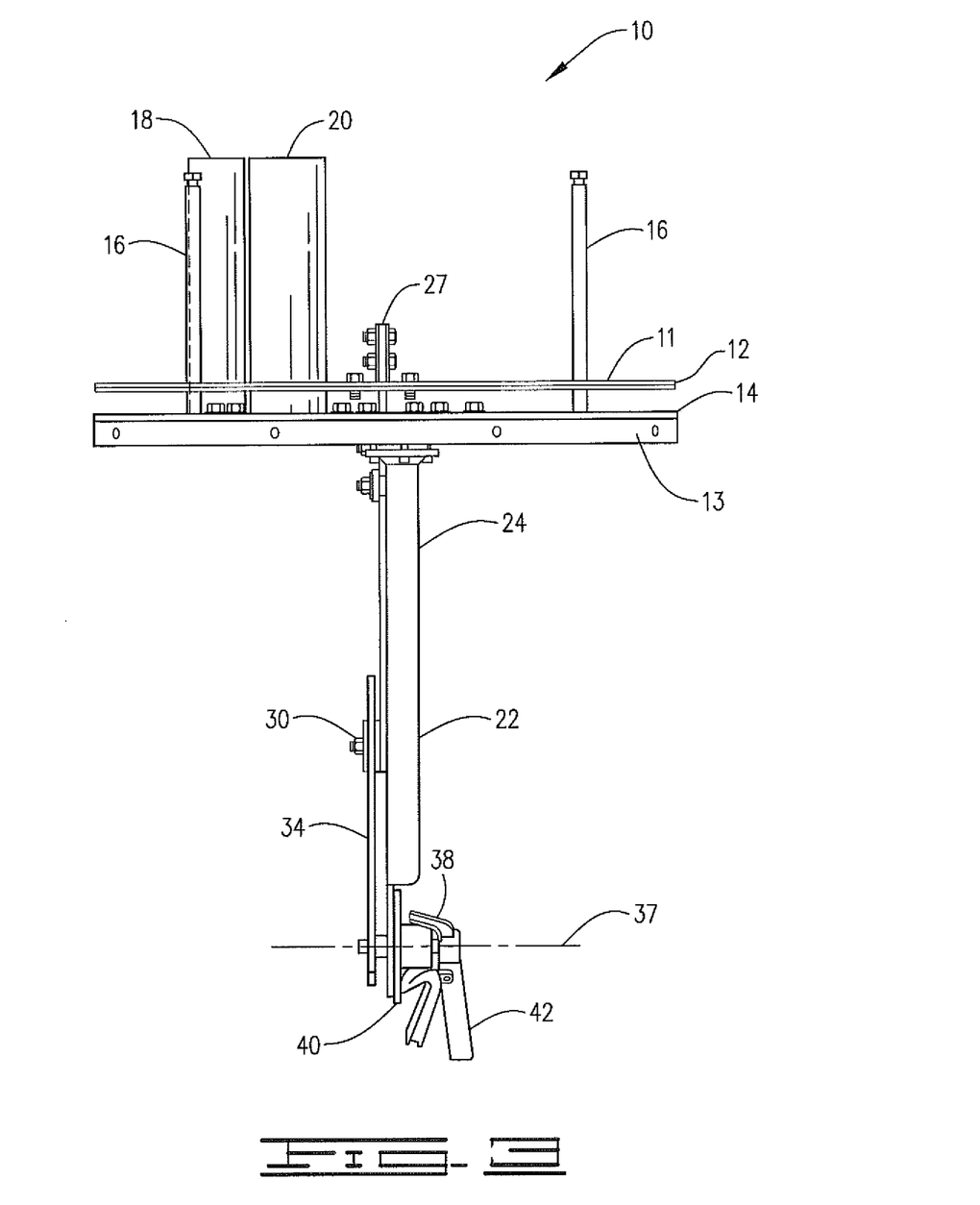
FIG. 3 is front elevation view of the damper of FIG. 1, shown with a cam.
Figure 4:
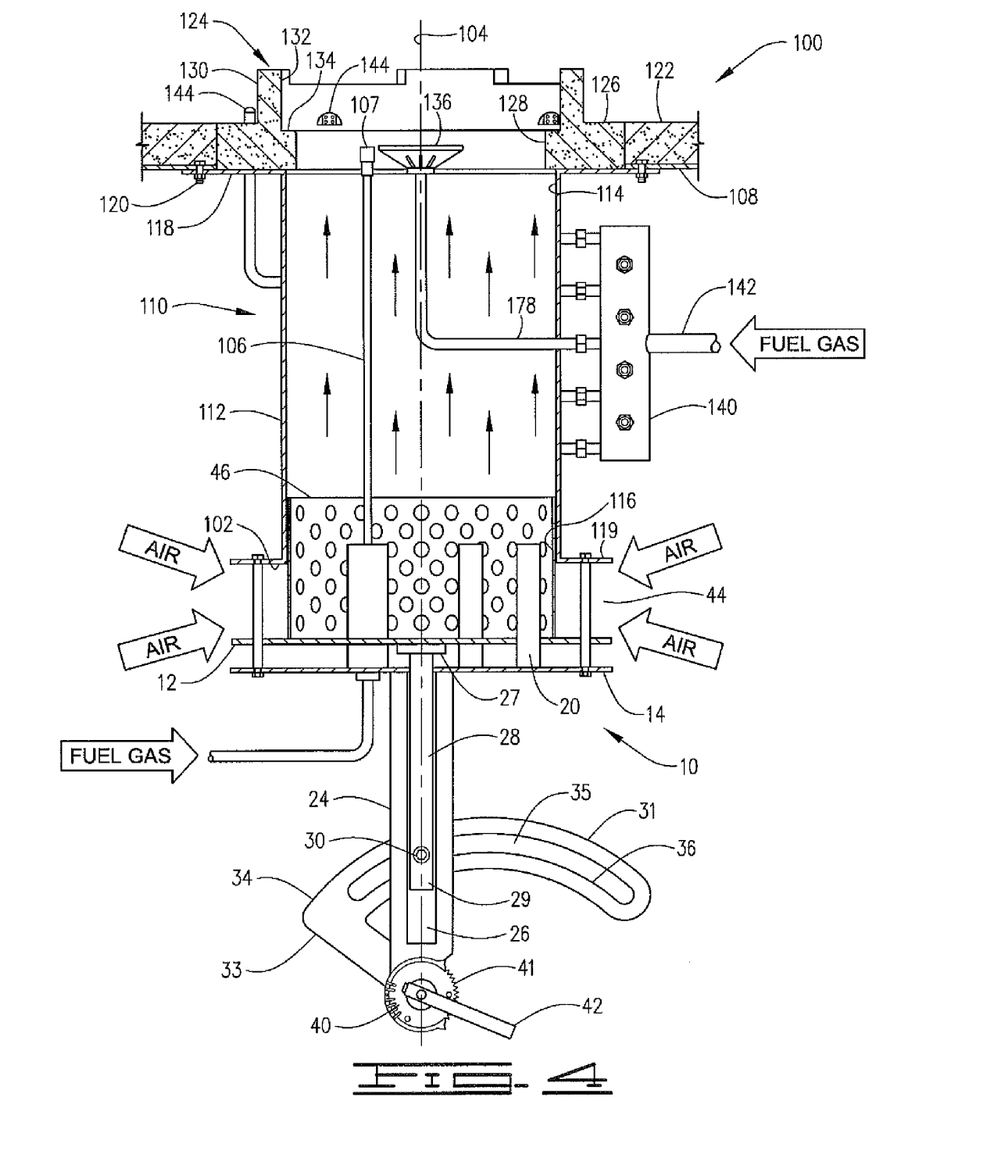
FIG. 4 is a section view of a burner utilizing a damper system in accordance with one embodiment of the invention.

Referring now to FIGS. 1-4, an air damper system according to the invention is illustrated and generally designated by the numeral 10. In FIG. 1, a perspective of the damper system 10 is shown. The view of FIG. 1 is not shown with a cam. Side and front elevation views of the damper system 10, with a cam, are illustrated in FIGS. 2 and 3. FIG. 4 illustrates the damper plate attached to a burner system 100.

Air damper system 10 comprises a damper plate 12 and fixed plate 14. Fixed plate 14 is sometimes called a front plate and for vertical burner arrangements it can be located below damper plate 12. Fixed plate 14 is mounted a fixed distance from the bottom of a burner system by mounts 16, see FIG. 4. Mounts 16 can be a spacer-type bolt or any similar mounting system that will not significantly impede air flow. Fixed plate 14 can be a flat disk as shown and can optionally have a ring 13 mounted thereon (as shown in FIGS. 1 and 3). Fixed plate 14 is designed to attach to the bottom of a plenum and to support the damper plate 12 and actuator 22. Fixed plate 14 can have a shape and thickness suitable for those functions.

Damper plate 12 is mounted between fixed plate 14 and the bottom of a plenum. Generally, it will be mounted between fixed plate 14 and a top ring or fixed ring (shown as flange 119 in FIG. 4), which is generally a ring having a flat bottom surface 102 and defining an aperture therein but can be designed as a plate having an aperture therein. Damper plate 12 can be a flat disk but may have other shapes if desired. Generally, damper plate 12 has a flat upper surface 11 that can contact fixed ring 119 so as to substantially stop air flow through flow path 44. Damper plate 12 is operationally connected to fixed plate 14 so that it is moveable relative to fixed plate 14 and the open end 116 of burner system 100. Generally the burner system will have a longitudinal axis 104, as illustrated in FIG. 4, and it is desirable that damper plate 12 move along longitudinal axis 104. Thus, for a vertical burner system, damper plate 12 will move generally upwards or downwards relative to fixed plate 14 and bottom 102 or open end 116.

Mounted on fixed plate 14 are guide tubes 18 and 20. Guide tubes 18 and 20 aid in guiding damper plate 12 when it is moving and help to keep it level with respect to bottom 102. Additionally, guide tubes 18 and 20 can serve as access ports into the burner system 100. For example, guide tube 18 can serve as an entrance port for the pilot assembly 106 and guide tube 20 can serve as a sight access port.

Mounted to the bottom surface 15 of fixed plate 14 is actuator 22. Actuator 22 is operationally connected to damper plate 12 to move it along longitudinal axis 104. Actuator 22 can be any suitable such actuating device. As shown, actuator 22 comprises a slide plate 24, slide shaft 28, cam 34 and ratcheted handle 38. Slide plate 24 is connected to fixed plate 14 and extends generally outward from the bottom surface 15 of fixed plate 14. Slide plate 24 has a channel 26 in which lies slide shaft 28. Slide shaft 28 can move longitudinally in channel 26 and is held in place by bolt 30, which extends through longitudinal aperture 32 located in channel 26. Bolt 30 is in sliding relation with aperture 32 so that bolt 30 can slide longitudinally within aperture 32. Additionally, bolt 30 connects to first end 29 of slide shaft 28. Slide shaft 28 extends slideably through fixed plate 14, and second end 27 of slide shaft 28 is connected to damper plate 12 so that longitudinal movement of slide shaft 28 results in longitudinal movement of damper plate 12. Bolt 30 is also slidingly connected to cam 34 and rests in slot 35 of cam 34 such that bolt 30 follows the lower edge 36 of slot 35. Bolt 30 may have a means to facilitate movement in aperture 32 and/or slot 35, such as a grooved wheel. Cam 34 comprises a radial arm 33 and an arced cam arm 31 having slot 35 and lower edge or cam edge 36. Radial arm 33 of cam 34 is pivotally connected at axis 37 of ratcheted handle 38. Ratcheted handle 38 comprises a ratcheted wheel 40 and grip handle 42. Ratcheted wheel 40 has teeth 41 that engage grip handle 42 such that grip handle 42 can be locked in discrete positions about ratcheted wheel 40. Additionally, ratcheted handle 38 and radial arm 33 of cam 34 are operatively connected such that turning ratcheted handle 38 pivots cam 34 about axis 37 and, when grip handle 42 is locked in a position, cam 34 is locked in place. Cam 34 can be any suitable cam but, as illustrated, is a non-linear cam, or a rotational cam, and is operatively connected to bolt 30 and slide shaft 28 so that rotational movement of cam 34 results in linear movement or straight-line movement of slide shaft 28 and, hence, damper plate 12.

As described above, "linear movement" or "straight-line movement" refers to the general direction of the movement of the damper plate and not the proportional movement of the cam and damper plate. While in one embodiment the damper plate and the cam can have a linearly proportional movement, in a preferred embodiment the damper plate and cam movements are not linearly proportional. Rather, the cam is designed to give linear volumetric air flow control of air passing through flow path 44. By "linear volumetric air flow control" it is meant that movement of the cam is sequenced with the movement of the damper plate to result in a linear change of the volume of air per unit time flowing through flow path 44. Accordingly, by way of nonlimiting example, moving the cam to a 50% of maximum air flow position will result in moving the damper plate to allow 50% of the maximum volume of air per unit time that can flow through flow path 44 even though the resulting movement of the damper plate may not be 50% of the longitudinal size of the fully open position, i.e. it may be 25% of the longitudinal size of the fully open position. As a further nonlimiting example, in natural draft burners, the pressure loss across flow path 44 will be directly proportional to the square of the burner duty; thus, when the burner duty drops by 50%, the pressure loss across flow path 44 will reduce by a factor of four. In such situations, the burner throat pressure loss will also be reduced as a result of drops in burner duty. To compensate for this, the longitudinal damper opening will need to be reduced to increase the pressure loss. The pressure loss across flow path 44 is approximately proportional to the inverse square of the longitudinal damper opening. Accordingly, the cam can be designed to give linear volumetric air flow control such that movement of the cam takes into account this inverse proportionality and pressure loss reduction based on burner duty; i.e., when there is a 50% drop in burner duty in a burner having a six inch maximum flow path (based on longitudinal size), the cam is designed such that, when the cam is moved to a fifty percent indicator the damper plate will be moved to reduce the flow path to one inch to increase the pressure loss by a factor that will maintain a stable pressure loss for the flow path and burner throat. To avoid confusion between "linear volumetric air control" and the movement of the cam and/or damper plate, hereinafter the word "linear" will be reserved to describe volumetric air control and movement of the cam, slide shaft, damper plate and such will be referred to as "rotational movement" or "straight-line movement" and similar.

Focusing now on FIG. 4, a burner system 100 using the above described air damper 10 can be seen. Burner system 100 is a natural draft burner system, thus air flows through the burner because of the light negative pressure created inside the burner system by the heat generated therein. Burner system 100 is sealingly attached to the bottom wall 108 of a furnace space over an opening therein. While gas burner apparatus are commonly mounted vertically and fired upwardly as shown in FIG. 4, it is to be understood that the burner apparatus can also be mounted horizontally and fired horizontally or vertically and fired downwardly and that terms used herein, such as up, upper, down or lower, are used for convenience in indicating direction.

The burner system 100 is comprised of a housing or plenum 110 having perimeter wall 112. Plenum 110 has an open end 114 and an open end 116 defining an air outlet and air inlet respectively. The plenum 110 is attached to the furnace wall 108 by means of a flange 118 and a plurality of bolts 120, which extend through complementary openings in the flange 118 and the wall 108. The furnace wall 108 includes an internal layer of insulating material 122 attached thereto, and the open end 114 of the plenum 110 includes a burner tile 124 formed of flame and heat resistant refractory material attached thereto. As illustrated in FIG. 4, the interior surface of the insulating material 122 attached to the furnace wall 108 and the top of the base portion 126 of the burner tile 124 define a furnace space within which the fuel gas and air discharged by the burner system 100 are burned. The burner tile 124 has a central opening 128 formed in the base portion 126 thereof through which air introduced into the plenum 110 by way of the air damper 10 is discharged. The burner tile 124 also includes a wall portion 130 having a recessed interior surface 132 which surrounds the opening 128, forms a circular ledge 134 and extends into the furnace space. The burner tile 124, the interior surface 132 of the wall portion 130 and the central opening 128 in the base portion 126 of the burner tile 124 as well as the plenum 110 can take various shapes, e.g., circular, rectangular, square, triangular, polygonal or other shape. However, the burner system 100 preferably includes a circular burner tile 124 having a circular opening 128 therein and a circular wall portion 130. Also, the plenum 110 preferably includes circular openings 114 and 116 therein and the plenum is preferably cylindrical. However, the plenum can also include square openings 114 and 116 therein and can have square or rectangular perimeter wall 112. In a preferred embodiment as shown in FIG. 4, the circular opening 128 in the circular burner tile 124 is smaller than the interior surface 132 of the wall 130 thereof so that the circular ledge 134 is provided within the burner tile 124 which functions as a flame stabilizing surface.

A central primary fuel gas nozzle 136 can be positioned within the opening 128 near the bottom of the burner tile 124. Nozzle 136 is connected by a conduit 178 to a fuel gas manifold 140. A conduit 142 connects manifold 140 to a source of pressurized fuel gas. Also, the burner system 100 can optionally include a plurality of nozzles 136 in lieu of the single nozzle 136. Nozzle 136 is lit by pilot tip 107 of pilot assembly 106. Pilot assembly 106 extends longitudinally through plenum 110, although other arrangements will be readily apparent to those skilled in the art. Additionally, a plurality of secondary fuel gas discharge nozzles 144 can be positioned in spaced relationship around the burner tile 124. The nozzles 144 are connected to fuel gas conduits which are connected to the fuel gas manifold 140. The burner tile 124, primary fuel gas nozzle 136 and/or secondary fuel gas discharge nozzles 144 make up the burner. While a specific burner arrangement has been described, it will be understood that the invention is not limited to the specific burner arrangement but can be utilized with other burner tiles and nozzle designs.

Air flow rate regulating register or damper system 10 is connected to the plenum 110 at its open end 116 for regulating the flow rate of combustion air entering the plenum 110. The damper system 10 is attached to the open end 116 by means of a fixed ring or flange 119 and a plurality of mounts 16 which extend through complementary openings in the flange 119, damper plate 12 and the fixed plate 14. Mounts 16 are in fixed engagement with flange 119 and fixed plate 14 and are in sliding engagement with damper plate 12 to allow movement of damper plate 12 along longitudinal axis 104. Optionally, damper plate 12 can have a smaller radius such that its outer edge is within the radius of the mounts. Flow path 44 is defined by damper plate 12 and the bottom 102, which in the illustrated embodiment is also the bottom of flange 119. Flow path 44 is a peripheral flow path. Accordingly, flow path 44 allows air to radially move through it into the plenum 110 from around the periphery of the bottom 102 of the plenum 110. Preferably the air will enter the flow path from substantially the entire perimeter around the bottom of the plenum; that is, from 360° around the perimeter. As indicated above, the plenum 110 can be any of various shapes. In one embodiment, damper plate 12 can be a matching shape to the cross-sectional shape of the plenum 110. Thus, in the case of a cylindrical plenum, the damper plate 12 can be a circular disk and the flow path 44 will be a circumferential flow path. In one embodiment, the shapes of the plenum and damper plate are matching so as to ensure that there is even flow of air into the flow path 44 from the entire perimeter and to ensure, when the damper plate is in its uppermost position, it is in contact with and is closed against flange 119 such that the air flow is substantially stopped. In this regard, as described above, flange 119 can have a flat bottom surface 102 and damper plate 12 can have a flat upper surface.

Optionally, damper plate 12 can have a perforated can or screen 46 mounted around its perimeter to shield the flow path from debris and birds and to serve as a noise muffler and to protect personnel. The screen 46 can be mounted on the damper plate, the front plate 14 or the flange 119. In the case of mounting on the front plate or flange, the damper plate should fit slideably within the screen. As illustrated in FIG. 4, screen 46 extends upward from the top surface of damper plate 12 into plenum 110. Screen 46 is slideably mounted in plenum 110 so as to not impede damper plate 12 from longitudinal movement. The perforations of screen 46 should be sufficient to allow adequate air flow into plenum 110 and to block debris from entering the plenum. However, screen 46 can also serve to change the amount of air flowing into air path

44. Thus, by varying the porosity of screen 46 for a given burner system, the linear volumetric air flow can be controlled. Additionally, by varying the porosity of the screen between different burner systems designs, different burner capacities can be achieved without changing the overall dimensions of the burner.

In operation of the burner system 100, fuel gas is introduced into the furnace space to which the burner system 100 is attached and burned therein at a flow rate which results in the desired heat release. Air is also introduced into the plenum 110 through damper system 10 and a column of the air flows into the furnace space. The flow rate of air introduced into the furnace space is in the range of from about 0% to about 100% in excess of the flow rate of air required to form a stoichiometric mixture of air and fuel gas. Preferably, the flow rate of air is in excess of the stoichiometric flow rate of air by about 15%. Stated another way, the mixture of fuel gas and air discharged into the furnace space contains from about 0% to about 100% of excess air.

As shown in FIG. 4, a peripheral flow path 44 is provided for the introduction of air into the open end 116 of the plenum 110. Air flows into flow path 44 from around the periphery of the damper system 10 and the bottom 102 of the plenum 110. The flow path allows for air introduction substantially 360° around the perimeter of the open end 116. The size of the flow path 44 can be adjusted by moving the damper plate 12 along the longitudinal axis 104. The damper plate 12 can be adjusted by moving a rotating a cam 34 and translating the rotational movement of the cam into straight-line movement of the damper plate 12. Upward movement of damper plate 12, or movement towards bottom 102, decreases the flow path size and downward movement of damper plate 12, or movement away from bottom 102, increases the flow path size. At its uppermost position, damper plate 12 is in contact with bottom 102 so that the flow path is closed and substantially no air passes into the plenum. Additionally, the actuator and its cam 34 are operationally connected to the damper plate to provide linear volumetric air flow control of the air flowing through flow path 44.

Air traveling through the flow path 44 into the open end 116 of the plenum 110 forms a unified column of air. By "unified column of air" it is meant that there is substantially even distribution laterally across the plenum of longitudinally moving air, or as illustrated in FIG. 4, upward moving air. The unified column of air flows through the plenum 110 and through the opening 128 in the burner tile 124 into the mixing zone formed within the interior and above the wall 130. While within the mixing zone, the air mixes with the fuel gas and flue gases. The resulting primary fuel gas-flue gases-air mixture containing a large excess of air is burned within and adjacent to the top of the burner tile 124 and the flue gases formed therefrom have very low $NO_X$ content due to the dilution of the fuel gas by the excess air and flue gases. In one embodiment, the burner (burner tile 124, primary fuel gas nozzle 136 and/or secondary fuel gas distribution nozzles 144), plenum 110, and damper plate 12 are all axially aligned along longitudinal axis 104. This embodiment, as illustrated in FIG. 4, ensures that air flowing in through air flow path 44 creates a unified column of air in plenum 110 and that the unified column of air reaches the burner (more specifically central opening 128 and primary fuel gas nozzle 136) with a minimum of maldistribution in the air flow. Further in this embodiment, flow path 44 can be the only air introduction path for the plenum, can be the only air introduction path for the burner and can be the only air introduction path for the burner system. Alternatively, flow path 44 can provide the primary air introduction and, hence, provide the major portion of air to the burner. A minor portion of the air introduced into the burner system can be introduced around the fuel gas nozzles. Accordingly, the invention can also be useful in staged air burners with the primary air being introduced through flow path 44 and the secondary air being introduced by nozzles around the fuel gas nozzles or in the furnace above the burner tile.

Figure 5:
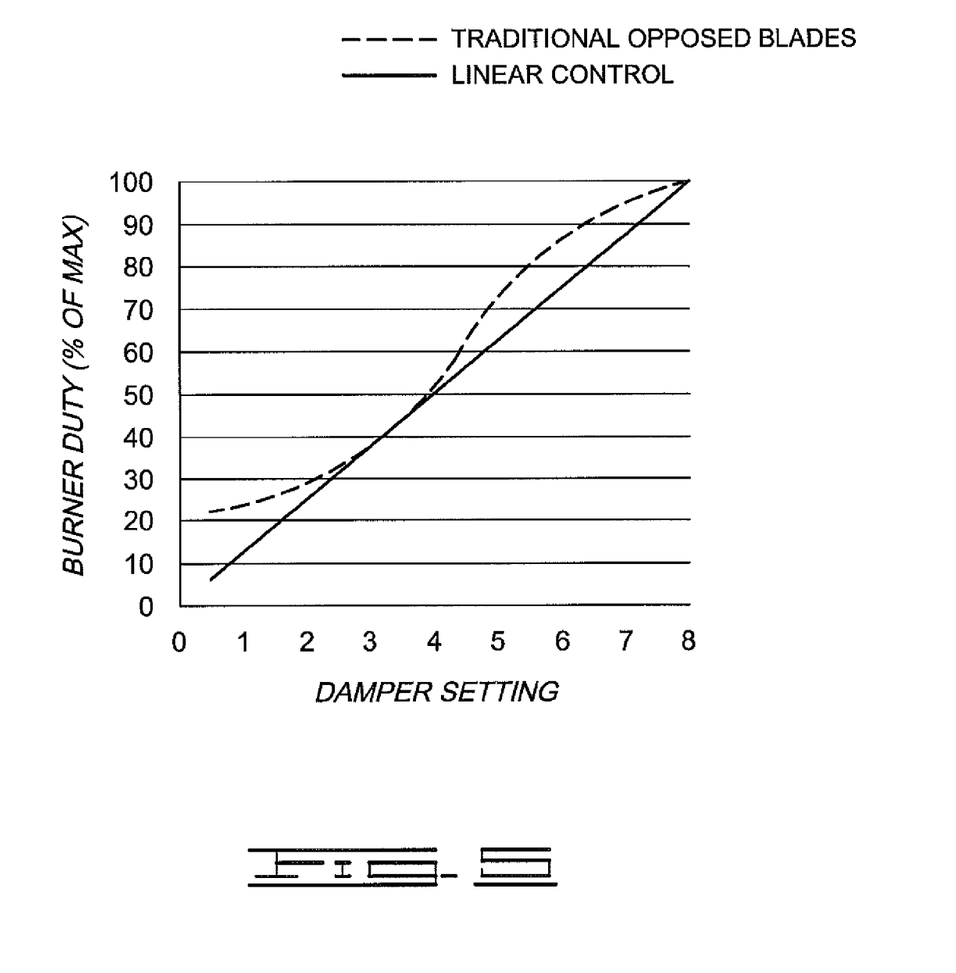
FIG. 5 is graphical illustration of burner duty versus damper setting for a traditional opposed blade damper system and for a linear volumetric air control damper system.
Figure 11:
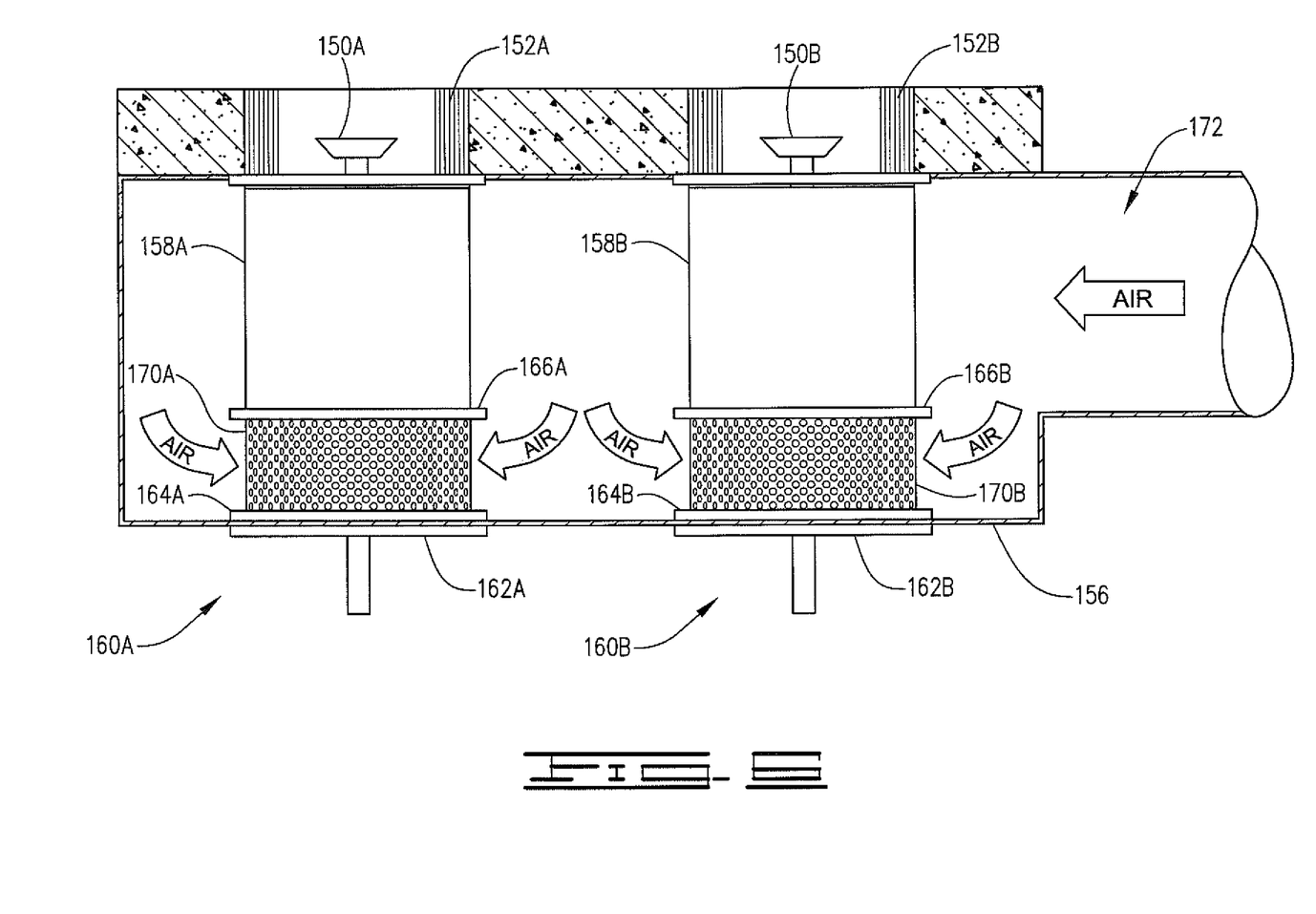

Accordingly, the inventive damper system allows for a unified column of air to enter the plenum and for linear volumetric control of air flowing through the flow path. In regard to linear volumetric control of the air flow, FIG. 5 is a graphical representation of burner duty versus damper setting for an opposed blade damper system and for a linear volumetric air control damper system. As can be seen by reference to FIG. 5, bladed damper systems, such as opposed blade dampers, do not provide for a linear air flow adjustment. Because of this, it is difficult to control the air flow into the plenum and difficult to adjust the air flow for changing conditions or changing burner operating parameters in a bladed damper system. The present air damper provides for more even air introduction into the plenum and more proportional control of the air flow in relation to the burner duty and, hence, more consistent air control.

While the invention is advantageous in natural draft burners because of its even air introduction and, hence, low susceptibility to flow maldistributions, the invention can also be used advantageously in forced draft burners. The invention can be particularly useful in an embodiment where force draft systems utilize multiple burners sharing a common plenum. FIG. 6 schematically illustrates two burners having primary nozzles 150A and 150B, and burner tiles 152A and 152B. Primary housing or primary plenum 156 surrounds the lower portion of the burner system including secondary plenums 158A and 158B and air damper systems 160A and 160B. Air damper systems 160A and 160B have front plates 162A and 162B, damper plates 164A and 164B, flanges 166A and 166B, and screens 170A and 170B. Also, the damper systems 160A and 160B can have an actuator (not shown) to adjust the height of the damper plates 164A and 164B. The actuator can be in accordance with the description above for FIGS. 1-4. Additionally, each damper system can have a separate control of the actuator by a ratcheted handle or automated control or can have a common control such as utilizing a jack shaft.

In operation, forced air or pressurized air is introduced into plenum 156 at air inlet 172. The forced air flows throughout plenum 156 and enters the burner systems through damper systems 160A and 160B by the flow paths created at screens 170A and 170B. The general flow of the forced air is shown by the arrows in FIG. 6. It will be realized by one skilled in the art by examination of FIG. 6, that the forced air will be subject to flow maldistribution across plenum 156 and can be susceptible to greater volumes of air being available to those burners closer to the air inlet 172. Damper plates 166A and 166B can be adjusted to different heights so that each burner system receives sufficient air to eliminate flow maldistribution resulting in efficient burning of fuel with low $NO_X$. Accordingly, damper systems 160A and 160B correct flow maldistributions caused by side entry of the forced air.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A burner system comprising:
a plenum having a perimeter wall having a first end with an air inlet disposed therein and a second end with an air outlet disposed therein, the first end opposing the second end;
a burner tile attached to the second end at the air outlet, the burner tile having an opening formed therein for allowing air to flow therethrough;
a primary fuel nozzle connectable to a fuel source and positioned in relation to the burner tile such that air and fuel are burned within and adjacent to the top of the burner tile;
a front plate mounted a fixed distance below the air inlet of the plenum;
a damper plate mounted between the first end and the front plate to thus form a peripheral flow path for the introduction of air into the inlet of the first end, wherein the front plate, damper plate, air inlet, air outlet and the opening of the burner tile are axially aligned along a longitudinal axis and the damper plate is moveable along the longitudinal axis such that the size of the flow path is changed; and
an actuator operationally connected to the damper plate, the actuator configured to provide linear volumetric air flow control of the introduction of air through the flow path, wherein the actuator moves the damper plate along the longitudinal axis to change the size of the flow path and wherein the actuator comprises:
a cam;
a ratcheted handle operatively connected to the cam so that the cam can be moved by the ratcheted handle and wherein the ratcheted handle can be locked in discrete positions; and
a slide shaft operatively connected to the cam and the damper plate such that movement of the cam results in movement of the damper plate.

2. The burner system of claim 1 wherein the air is introduced through the flow path so as to supply a unified column of air to the burner tile.

3. The burner system of claim 1 further comprising a guide tube mounted on the front plate to guide the damper plate in level movement.

4. The burner system of claim 3 wherein the guide tube provides an access port to the plenum.

5. The burner system of claim 1 further comprising a screen mounted around the perimeter of the damper plate so as to extend around the flow path.

6. The burner system of claim 1 wherein the cam is a rotational cam and rotational movement of the cam is transferred as straight-line movement of the damper plate.

7. The burner system of claim 1 wherein the primary fuel nozzle is located in the opening of the burner tile.

8. The burner system of claim 7 wherein the flow path is the only flow path for supplying air to the primary fuel nozzle.

9. The burner system of claim 7 wherein the burner tile further comprises a wall defining the opening and further comprising a plurality of secondary fuel nozzles located around the wall.

10. The burner system of claim 9 wherein the flow path is the only flow path for supplying air to the primary fuel nozzle and secondary fuel nozzles.

11. A burner system comprising:
a plenum having a perimeter wall having a first end with an air inlet disposed therein and a second end with an air outlet disposed therein, the first end opposing the second end;
a fuel source;
a burner tile attached to the second end at the air outlet, the burner tile having an opening formed therein for allowing air to flow therethrough and a wall defining the opening;
a primary fuel nozzle connected to the fuel source and positioned in the opening of the burner tile such that air and fuel are burned within and adjacent to the top of the burner tile;
a plurality of secondary fuel nozzles located around the wall of the burner tile;
a front plate mounted a fixed distance below the air inlet of the plenum;
a damper plate mounted between the lower end and the front plate to thus form a peripheral flow path for the introduction of air into the inlet of the lower end, wherein the front plate, damper plate, air inlet, air outlet and the opening of the burner tile are axially aligned along a longitudinal axis and the damper plate is moveable along the longitudinal axis such that the size of the flow path is changed and wherein air is introduced through the flow path so as to supply a unified column of air to the burner tile and the flow path is the only flow path for supplying air to the primary fuel nozzle and secondary fuel nozzles;
a guide tube mounted on the front plate to guide the damper plate in level movement and provide an access port to the plenum; and
an actuator operationally connected to the damper plate and configured to provide linear volumetric air flow control of the introduction of air through the flow path wherein the actuator moves the damper plate and comprises:
a rotational cam;
a ratcheted handle operatively connected to the cam so that the cam can be moved by the ratcheted handle and wherein the ratcheted handle can be locked in discrete positions; and
a slide shaft operatively connected to the cam and the damper plate such that rotational movement of the cam results in straight-line movement of the damper plate.

12. A burner system comprising:
a primary plenum having an air inlet;
at least two secondary plenums located within said primary plenum and having a perimeter wall having a first end with an air inlet disposed therein and a second end with an air outlet disposed therein, the first end opposing the second end; wherein each secondary plenum has:
a burner tile attached to the second end at the air outlet, the burner tile having an opening formed therein for allowing air to flow therethrough;
a primary fuel nozzle connectable to a fuel source and positioned in relation to the burner tile such that air and fuel are burned within and adjacent to the top of the burner tile;
a front plate mounted outside the secondary plenum and a fixed distance from the air inlet of the plenum and is located inside the primary plenum;
a damper plate mounted between the first end and the front plate to thus form a peripheral flow path for the introduction of air into the inlet of the first end, wherein the front plate, damper plate, air inlet, air outlet and the opening of the burner tile are axially aligned along a longitudinal axis and the damper plate is moveable along the longitudinal axis such that the size of the flow path is changed; and a screen mounted around the perimeter of the damper plate so as to extend around the flow path.

13. The burner system of claim 12 wherein the air is introduced into the secondary plenums through the flow path so as to supply a unified column of air to the burner tile.

14. The burner system of claim 12 wherein each secondary plenum is operationally connected to an actuator such that the actuator provides linear volumetric air flow control of the introduction of air through the flow path.

15. The burner system of claim 14 wherein the actuator moves the damper plate along the longitudinal axis.

16. A burner system comprising:
a plenum having a perimeter wall having a first end with an air inlet disposed therein and a second end with an air outlet disposed therein, the first end opposing the second end;
a burner tile attached to the second end at the air outlet, the burner tile having an opening formed therein for allowing air to flow therethrough;
a primary fuel nozzle connectable to a fuel source and positioned in relation to the burner tile such that air and fuel are burned within and adjacent to the top of the burner tile;
a front plate mounted a fixed distance below the air inlet of the plenum;
a damper plate mounted between the first end and the front plate to thus form a peripheral flow path for the introduction of air into the inlet of the first end, wherein the front plate, damper plate, air inlet, air outlet and the opening of the burner tile are axially aligned along a longitudinal axis and the damper plate is moveable along the longitudinal axis such that the size of the flow path is changed; and
a guide tube mounted on the front plate to guide the damper plate in level movement, wherein the guide tube provides an access port to the plenum.

17. The burner system of claim 16, further comprising an actuator operationally connected to the damper plate, the actuator configured to provide linear volumetric air flow control of the introduction of air through the flow path, wherein the actuator moves the damper plate along the longitudinal axis to change the size of the flow path and wherein the actuator comprises:
a cam; and
a slide shaft operatively connected to the cam and the damper plate such that movement of the cam results in movement of the damper plate.

18. The burner system of claim 17, wherein the cam is a rotational cam and rotational movement of the cam is transferred as straight-line movement of the damper plate.

19. The burner system of claim 18, wherein said actuator further comprises a ratcheted handle operatively connected to the cam so that the cam can be moved by the ratcheted handle and wherein the ratcheted handle can be locked in discrete positions.

20. The burner system of claim 16, further comprising a screen mounted around the perimeter of the damper plate so as to extend around the flow path.

21. The burner system of claim 16, wherein the burner tile further comprises a wall defining the opening and a plurality of secondary fuel nozzles located around the wall, wherein the primary fuel nozzle is located in the opening of the burner tile; and wherein the flow path is the only flow path for supplying air to the primary fuel nozzle.

22. A burner system comprising:
a plenum having a perimeter wall having a first end with an air inlet disposed therein and a second end with an air outlet disposed therein, the first end opposing the second end;
a burner tile attached to the second end at the air outlet, the burner tile having an opening formed therein for allowing air to flow therethrough;
a primary fuel nozzle connectable to a fuel source and positioned in relation to the burner tile such that air and fuel are burned within and adjacent to the top of the burner tile;
a front plate mounted a fixed distance below the air inlet of the plenum;
a damper plate mounted between the first end and the front plate to thus form a peripheral flow path for the introduction of air into the inlet of the first end, wherein the front plate, damper plate, air inlet, air outlet and the opening of the burner tile are axially aligned along a longitudinal axis and the damper plate is moveable along the longitudinal axis such that the size of the flow path is changed; and
a screen mounted around the perimeter of the damper plate so as to extend around the flow path.

23. The burner system of claim 22, further comprising an actuator operationally connected to the damper plate, the actuator configured to provide linear volumetric air flow control of the introduction of air through the flow path, wherein the actuator moves the damper plate along the longitudinal axis to change the size of the flow path and wherein the actuator comprises:
a cam; and
a slide shaft operatively connected to the cam and the damper plate such that movement of the cam results in movement of the damper plate.

24. The burner system of claim 23, wherein the cam is a rotational cam and rotational movement of the cam is transferred as straight-line movement of the damper plate.

25. The burner system of claim 24, wherein said actuator further comprises a ratcheted handle operatively connected to the cam so that the cam can be moved by the ratcheted handle and wherein the ratcheted handle can be locked in discrete positions.

26. The burner system of claim 22, wherein the burner tile further comprises a wall defining the opening and a plurality of secondary fuel nozzles located around the wall, wherein the primary fuel nozzle is located in the opening of the burner tile; and wherein the flow path is the only flow path for supplying air to the primary fuel nozzle.

27. A burner system comprising:
a plenum having a perimeter wall having a first end with an air inlet disposed therein and a second end with an air outlet disposed therein, the first end opposing the second end;
a burner tile attached to the second end at the air outlet, the burner tile having an opening formed therein for allowing air to flow therethrough;
a primary fuel nozzle connectable to a fuel source and positioned in relation to the burner tile such that air and fuel are burned within and adjacent to the top of the burner tile;
a damper plate forming a flow path for the introduction of air into the air inlet of the first end, wherein the damper plate is moveable such that the size of the flow path is changed; and
an actuator operationally connected to the damper plate, the actuator configured to provide linear volumetric air flow control of the introduction of air through the flow path, wherein the actuator moves the damper plate to change the size of the flow path and wherein the actuator comprises:
- a rotational cam; and
- a slide shaft operatively connected to the cam and the damper plate such that rotational movement of the cam results in straight line movement of the damper plate.

28. The burner system of claim 27, wherein the damper plate is connected to the plenum to form a peripheral flow path for the introduction of air into the inlet of the first end, wherein the damper plate, the air inlet, the air outlet and the opening of the burner tile are axially aligned along a longitudinal axis and the actuator moves the damper plate along the longitudinal axis to change the size of the flow path.

29. The burner system of claim 28, further comprising:
- a front plate mounted a fixed distance below the air inlet of the plenum, and wherein the damper plate is mounted between the first end and the front plate to thus form a peripheral flow path for the introduction of air into the inlet of the first end.

30. The burner system of claim 29, wherein said actuator further comprises a ratcheted handle operatively connected to the cam so that the cam can be moved by the ratcheted handle, and wherein the ratcheted handle can be locked in discrete positions.

* * * * *